(12) United States Patent
Rizwan et al.

(10) Patent No.: US 11,265,293 B2
(45) Date of Patent: Mar. 1, 2022

(54) WIRELESS ADAPTOR AND WIRELESS GATEWAY HAVING BUILT-IN FIREWALLS FOR SECURE ACCESS TO INSTRUMENTS

(71) Applicant: Honeywell International Inc., Morris Plains, NJ (US)

(72) Inventors: Mohammed Rizwan, Bangalore (IN); Prasad Samudrala, Bangalore (IN); Jayashree Balakrishnan, Nanganallur (IN); Ramesh Babu Koniki, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 226 days.

(21) Appl. No.: 16/591,167

(22) Filed: Oct. 2, 2019

(65) Prior Publication Data

US 2020/0137027 A1  Apr. 30, 2020

Related U.S. Application Data

(60) Provisional application No. 62/750,969, filed on Oct. 26, 2018.

(51) Int. Cl.
*G06F 21/00* (2013.01)
*H04L 29/06* (2006.01)
*H04W 12/088* (2021.01)
*H04W 88/16* (2009.01)
*H04W 80/02* (2009.01)

(52) U.S. Cl.
CPC ....... *H04L 63/0263* (2013.01); *H04W 12/088* (2021.01); *H04W 80/02* (2013.01); *H04W 88/16* (2013.01)

(58) Field of Classification Search
CPC ..... H04L 63/0263; H04L 63/00; H04L 63/02; H04L 63/14; H04W 12/088; H04W 80/02; H04W 88/16; H04W 12/001
USPC .......................................................... 726/1
See application file for complete search history.

(56) References Cited

U.S. PATENT DOCUMENTS

| 8,103,214 B2 | 1/2012 | Becker et al. |
| 8,204,078 B2 | 6/2012 | McLaughlin |
| 8,782,771 B2 * | 7/2014 | Chen ................... H04L 63/0245 726/13 |
| 2004/0260408 A1 | 12/2004 | Scott et al. |
| 2008/0248835 A1 * | 10/2008 | Hansson ........... H04M 1/72409 455/559 |

(Continued)

OTHER PUBLICATIONS

Notification of Transmittal of the International Search Report and Written Opinion of the International Searching Authority, dated Jan. 30, 2020, 7 Pages.

*Primary Examiner* — Josnel Jeudy
(74) *Attorney, Agent, or Firm* — Paschall & Associates, LLC; James C. Paschall

(57) ABSTRACT

An apparatus and method is disclosed for the secure access to field instruments. An interface device that includes a built-in firewall, is communicatively coupled between the device manager of an industrial automation process control system and a network of field instruments. The interface device includes at least one processor configured to execute instructions that provides a firewall for the one or more field instruments by blocking one or more user selected commands from being sent to the field instruments from the device manager.

15 Claims, 5 Drawing Sheets

(56) References Cited

U.S. PATENT DOCUMENTS

| | | | |
|---|---|---|---|
| 2008/0282335 A1* | 11/2008 | Abzarian | G06F 9/45512 |
| | | | 726/11 |
| 2011/0072506 A1* | 3/2011 | Law | H04L 63/1416 |
| | | | 726/11 |
| 2011/0162060 A1* | 6/2011 | Vijayakumar | H04L 12/413 |
| | | | 726/13 |
| 2012/0185631 A1* | 7/2012 | Lin | G06F 13/4027 |
| | | | 710/306 |
| 2012/0236768 A1* | 9/2012 | Kolavennu | H04L 69/08 |
| | | | 370/310 |
| 2013/0021167 A1 | 1/2013 | Harper, Jr. | |
| 2014/0277604 A1* | 9/2014 | Nixon | G05B 19/4185 |
| | | | 700/47 |
| 2018/0027071 A1* | 1/2018 | Toepke | H04L 67/12 |
| | | | 709/217 |
| 2018/0109955 A1 | 4/2018 | Nixon et al. | |
| 2021/0099424 A1* | 4/2021 | Li | H04L 67/12 |

\* cited by examiner

WIRELESS ADAPTOR AND WIRELESS GATEWAY HAVING BUILT-IN FIREWALLS FOR SECURE ACCESS TO INSTRUMENTS

CROSS-REFERENCE TO RELATED APPLICATION AND PRIORITY CLAIM

This application claims priority under 35 U.S.C. sctn. 119(e) to U.S. Provisional Patent Application No. 62/750,969, filed on Oct. 26, 2018, which is to hereby incorporated by reference in its entirety.

TECHNICAL FIELD

This disclosure relates generally to industrial process control and automation systems. More specifically, this disclosure relates to a wireless adaptor and wireless gateway having built-in firewalls for secure access to instruments.

BACKGROUND

Industrial process control and automation systems are often used to automate large and complex industrial processes. These types of systems routinely include various components including sensors, actuators, and process controllers. Some of the process controllers can receive measurements from the sensors and generate control signals for the actuators.

While originally viewed negatively due to actual or perceived concerns over reliability, it has become common for wireless devices to be used for data acquisition and monitoring functions in control and automation systems. Data acquisition functions generally relate to capturing data associated with one or more industrial processes and relaying that data to one or more destinations. Monitoring functions generally relate to monitoring the operation of one or more industrial processes in order to identify abnormal or other conditions associated with the industrial processes.

SUMMARY

This disclosure provides a wireless gateway and wireless adaptor apparatus having built-in firewalls for secure access to field instruments and a method for use thereof.

In a first embodiment, the apparatus includes a wireless adaptor including at least one interface configured to be coupled to one or more wired field devices. The wireless adaptor also includes at least one wireless radio configured to communicate over a wireless network and to receive commands for the one or more field devices over the wireless network. The wireless adaptor further comprising of at least one processor configured to execute instructions that provide a firewall for the one or more wired field devices by blocking one or more of the commands from being sent to the one or more wired field devices.

In a second embodiment, a method includes coupling at least one interface of a wireless adaptor to one or more wired field devices using at least one wireless radio. The wireless adaptor communicating over a wireless network to receive commands for the one or more wired field devices over the wireless network. The method further including using at least one processor of the wireless adaptor to execute instructions that provide a firewall for the one or more wired field devices by blocking one or more of the commands from being sent to the one or more wired field devices.

In a third embodiment, the apparatus includes a wireless gateway comprising at least one interface configured to be coupled to one or more networks. The wireless gateway also comprising at least one wireless radio configured to communicate over a wireless network and to transmit commands for one or more wireless field devices over the wireless network. The wireless gateway further comprising at least one processor configured to execute instructions that provide a firewall for the one or more wireless field devices by blocking one or more of the commands from being sent to the one or more wireless field devices.

In a fourth embodiment, a method includes coupling at least one interface of a wireless gateway to one or more networks using at least one wireless radio of the wireless gateway to communicate over a wireless network and to transmit commands for one or more wireless field devices over the wireless network. The method further including using at least one processor of the wireless gateway to execute instructions that provides a firewall for the one or more wireless field devices by blocking one or more of the commands from being sent to the one or more wireless field devices.

In a fifth embodiment, a non-transitory computer readable medium containing instruction, that when executed by at least one processing device, causes at least one processing device to couple a wireless interface to a wireless network using at least one wireless radio and to communicate over the wireless network to transmit commands to one or more field devices. The method further includes using the processor of the wireless interface to execute instructions that provides a firewall for the one or more field devices by blocking one or more of the commands from being sent to the one or more field devices.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
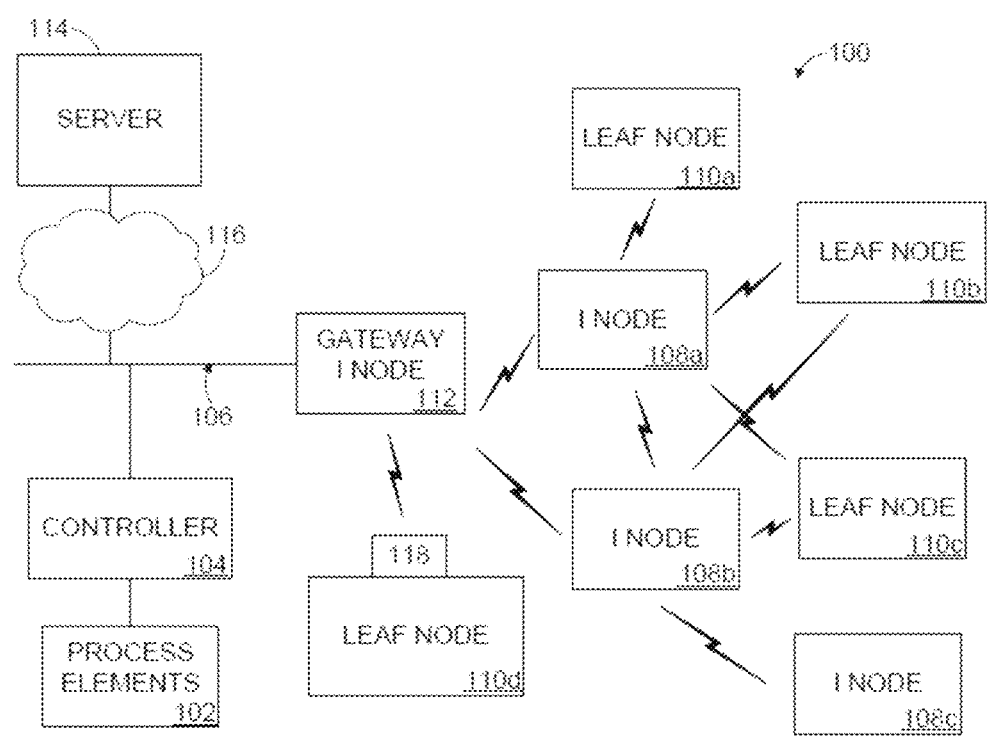
FIG. 1 illustrates an example industrial control and automation system according to this disclosure.
Figure 2:
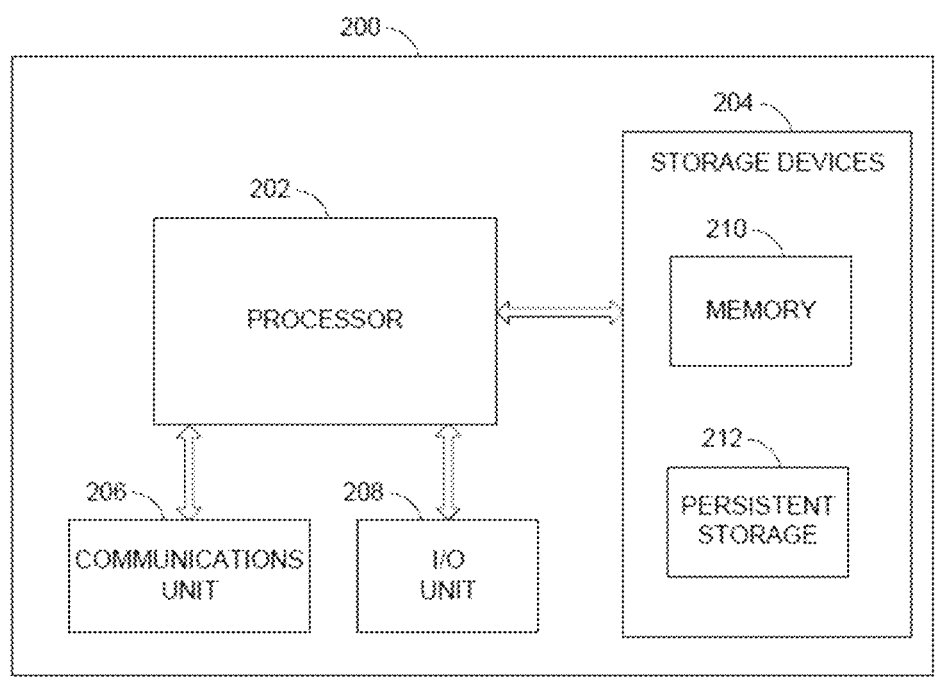
FIG. 2 illustrates an example device having a built-in firewall for secure access to instruments within a wireless adaptor or wireless gateway according to this disclosure.

FIGS. 1 and 2, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, it has become common for wireless devices to be used for data acquisition and monitoring functions in industrial process control and automation systems. As industrial wireless protocols are used more and more in safety and control applications, there is a need for implementing firewalls on various types of devices (such as wireless network adaptors and wireless network gateways) to avoid configuration changes to field instruments when the field instruments are in use. Some of this is driven by the desire to avoid inadvertent changes to field instruments. For instance, a field instrument connected to a wireless adaptor could be accessible by a handheld device, where the handheld device connects to a physical wire loop in order to configure the field instrument. It is possible that configuration commands sent to the field instrument over the physical wire loop could be received by and reconfigure a different device. Some of this is also driven by the desire to protect field instruments from cybersecurity threats, such as malware. Often, industrial wireless protocols are open protocols and provide no protection for the lowest-level devices in industrial control and automation systems, such as various types of field devices. These types of concerns are slowing the adoption of industrial wireless protocols in industrial settings.

This disclosure provides various architectures for wireless adaptors and wireless gateways that incorporate built-in configurable firewalls, which provide novel approaches for providing unique cybersecurity-enabled products. With the incorporation of the configurable firewalls, the wireless adaptors and wireless gateways can provide security for field instruments coupled to or communicating with the wireless adaptors and wireless gateways. Thus, facilities that are reluctant to use wireless technologies because of security or safety concerns may be more likely to adopt industrial wireless solutions, which often provide for lower costs, faster deployments, and easier maintenance compared to wired solutions. Moreover, with the increasing adoption of wireless technologies for safety and control applications in various process industries, it may be useful or desirable to make sure the configurations of wireless devices are not changed by applications, such as asset management software. The firewall in a wireless gateway or wireless adaptor can help to filter out unintended or undesirable configuration change or to alert control and safety systems when a configuration change occurs.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

At least one controller 104 is coupled to the process elements 102. Each controller 104 controls the operation of one or more of the process elements 102. For example, the controller 104 could receive information associated with the process system, such as sensor measurements from some of the process elements 102. The controller 104 could use this information to generate control signals for others of the process elements 102, such as actuators, to thereby adjust the operation of those process elements 102. Each controller 104 includes any suitable structure for controlling one or more process elements 102. Each controller 104 could, for example, represent a computing device executing multivariable or other control logic.

At least one network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations.

As shown in FIG. 1, the system 100 also includes one or more wireless networks for communicating with wireless sensors or other wireless field devices. In this example, the wireless network includes one or more infrastructure nodes ("I nodes") 108a-108c, one or more leaf nodes 110a-110d, and one or more gateway infrastructure nodes 112.

The infrastructure nodes 108a-108c and leaf nodes 110a-110d engage in wireless communications with each other. For example, the infrastructure nodes 108a-108c may receive data transmitted over the network 106 (via a gateway infrastructure node 112) and wirelessly communicate the data to the leaf nodes 110a-110d. Also, the leaf nodes 110a-110d may wirelessly communicate data to the infrastructure nodes 108a-108c for forwarding to the network 106 (via a gateway infrastructure node 112). In addition, the infrastructure nodes 108a-108c may wirelessly exchange data with one another. In this way, the nodes 108a-108c, 112 (and optionally the nodes 110a-110d) form a wireless network capable of providing wireless coverage to leaf nodes and other devices in a specified area, such as a large industrial complex.

In this example, the nodes 108a-108c and 110a-110d are divided into infrastructure nodes and leaf nodes. The infrastructure nodes 108a-108c typically represent routing devices that can store and forward messages for other devices. On the other hand, the leaf nodes 110a-110d are generally non-routing devices that do not store and forward messages for other devices (although they could) and include field devices or field instruments. Infrastructure nodes 108a-108c can be line-powered devices (meaning these nodes receive operating power from an external source) or powered by local power supplies (such as internal batteries or other internal power supplies). Leaf nodes 110a-110d typically represent devices powered by local power supplies. Leaf nodes 110a-110d are often more limited in their operations, such as to help preserve the operational life of their power supplies.

The nodes 108a-108c and 110a-110d include any suitable structures facilitating wireless communications, such as radio frequency (RF) frequency-hopping spread spectrum (FHSS) or direct sequence spread spectrum (DSSS) transceivers. The nodes 108a-108c and 110a-110d could also include other functionality, such as functionality for generating or using data communicated over the wireless network. For example, the leaf nodes 110a-110d could include wireless sensors used to measure various characteristics within an industrial facility. The sensors could collect and communicate sensor readings to the controller 104 via the wireless network. The leaf nodes 110a-110d could also include wireless actuators that receive control signals from the controller 104 and that adjust the operation of the industrial facility. In this way, the leaf nodes may include or operate in a similar manner as the process elements 102 physically connected to the controller 104. The leaf nodes 110a-110d could further include handheld user devices (such as INTELATRAC devices from HONEYWELL INTERNATIONAL INC.), mobile stations, programmable logic controllers, process controllers, or any other or additional devices. The infrastructure nodes 108a-108c, 112 may also include any of the functionality of the leaf nodes 110a-110d or the controller 104.

The gateway infrastructure node 112 functions as an infrastructure node and communicates wirelessly with, transmits data to, and receives data from one or more infrastructure nodes and possibly one or more leaf nodes. The gateway infrastructure node 112 also converts data between protocol(s) used by the network 106 and protocol(s) used by the nodes 108a-108c and 110a-110d. For example, the gateway infrastructure node 112 could convert Ethernet-formatted data transported over the network 106 into one of multiple wireless protocol formats used by the nodes 108a-108c and 110a-110d. The gateway infrastructure node 112 could also convert data received from one or more of the nodes 108a-108c and 110a-110d into Ethernet-formatted data for transmission over the network 106. In addition, the gateway infrastructure node 112 could support various functions, such as network creation and security, used to create and maintain a wireless network. The gateway infrastructure node 112 includes any suitable structure for facilitating communication between components or networks using different protocols.

The system 100 here also includes one or more servers 114. Each server 114 denotes a computing device that executes applications for users or other applications. The applications could be used to support various functions for the controllers 106, the wireless network, or other components of the system 100, such as an asset management application related to the system 100. Each server 114 could represent a computing device running a WINDOWS operating system or other operating system. Note that while shown as being local within the control and automation system 100, the functionality of the server 114 could be remote from the control and automation system 100. For instance, the server 114 could be communicatively coupled to the system 100 via at least one network 116. This may allow, for instance, the server 114 to be remote from the system 100. This may also allow the functionality of the server 114 to be implemented in a computing cloud. If the server 114 is remote, a gateway could be positioned between the networks 106 and 116 to restrict access to the system 100.

In some embodiments, at least one gateway infrastructure node 112 includes a built-in firewall that can be used to protect leaf nodes 110a-110d or other lower-level devices in the system 100. In other embodiments, at least one leaf node 110a-110d (such as a wired field device) can be coupled to a wireless adaptor 118 (which supports wireless communication using at least one industrial wireless network protocol), and the wireless adaptor 118 includes a built-in firewall that can be used to protect the associated leaf node(s) 110a-110d or other lower-level device(s) in the system 100. The Wireless Highway Addressable Remote Transducer (WirelessHART) protocol is used as an industrial wireless network protocol by this disclosure. However, any other or additional industrial wireless network protocols could also be used here, such as an ISA100 wireless network protocol (and the field devices and wireless network may or may not use the same protocol). Also, note that this disclosure is not limited to any wireless protocol or any particular wireless gateway or wireless adaptor. In general, any wireless gateway or wireless adapter when acting as a tunnel to at least one foreign protocol (such as Modbus) can implement a similar firewall to filter out commands, parameters, registers, or other information.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated in FIG. 1 as being used along with a wired controller 104 and wired process elements 102, the wireless network could be used without any wired process elements or controllers. In addition, FIG. 1 illustrates one example operational environment where built-in firewalls for secure access to instruments can be used in wireless gateways and wireless adaptors. This functionality can be used in any other suitable system.

FIG. 2 illustrates an example device 200 having a built-in firewall for secure access to instruments within a wireless adaptor or wireless gateway according to this disclosure. For ease of explanation, the device 200 is described as being used in the industrial control and automation system 100 of FIG. 1. The device 200 could, for example, represent at least part of a gateway infrastructure node 112 or wireless adaptor 118 in FIG. 1. However, the device 200 could be used in any other suitable system and could represent any suitable device in that system.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry. The processor 202 could execute any suitable instructions, such as those implementing a firewall as well as those implementing desired gateway/adaptor functionality.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

Each communications unit 206 supports communications with other systems or devices. For example, at least one communications unit 206 could include one or more wireless radios. When used in a wireless gateway 112, the one or more wireless radios can be used to communicate with infrastructure and leaf nodes 110a-110c. When used in a wireless adaptor, the one or more wireless radios can be used to communicate with infrastructure nodes 108a-108c and gateway infrastructure node 112. The communications unit 206 can also include at least one interface that supports communications over one or more wired connections, such as with one or more field instruments (in a wireless adaptor) or with one or more data networks (in a wireless gateway). Each communications unit 206 may support communications through any suitable physical or wireless communication link(s).

Each I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the use of the I/O unit 208 for local I/O may not be needed, such as when the device 200 is accessible locally or remotely over a network connection.

The present disclosure contemplates the incorporation of a built-in firewall into a WirelessHART (Highway Addressable Remote Transducer) infrastructure gateway 112 or a WirelessHART adaptor 118. Note that these details relate to specific implementations for the WirelessHART network protocol and that other embodiments could differ from these implementations without departing from the scope of this disclosure. For instance, other industrial wireless network protocol(s) could be used instead of, or in addition to, the WirelessHART communication protocol, such as the ISA100 industrial wireless protocol.

The WirelessHART infrastructure gateway 112 acts as a wireless gateway between other automation systems, controllers and asset management software, to wireless field instruments or other wireless devices operating under a WirelessHART communication protocol.

Wireless adaptors, such as wireless adapter 118, are wireless communications equipment used to connect wired field instruments to a process control and automation system. The wireless adapters provide the capability of wireless communication to wired field instruments contained in wired leaf node, such as leaf node 110d. The adaptor 118 provides a communication gateway, providing access to the process variables and diagnostic information furnished by wired field instruments in a leaf node and acts as a wired master to the field instruments and a wireless slave to a wireless infrastructure gateway 112.

Both a WirelessHART infrastructure gateway or adaptor with a built-in configurable firewall will secure HART instruments from any unwanted/unauthorized write access and misconfigurations. The HART 7.0 Specification has added new HART commands such Command 75, Command 84 and Command 77 that enables identification of the field instruments operating under the HART protocol connected to a wireless gateway or adapter, allowing for transmission of embedded commands to these field instruments. The WirelessHART gateway or adapter operating under the HART 7.0 specification, provides for complete access to the process and configuration data to a connected field instrument including process variables, fields instrument configurations and diagnostic/maintenance Information.

Figure 3:
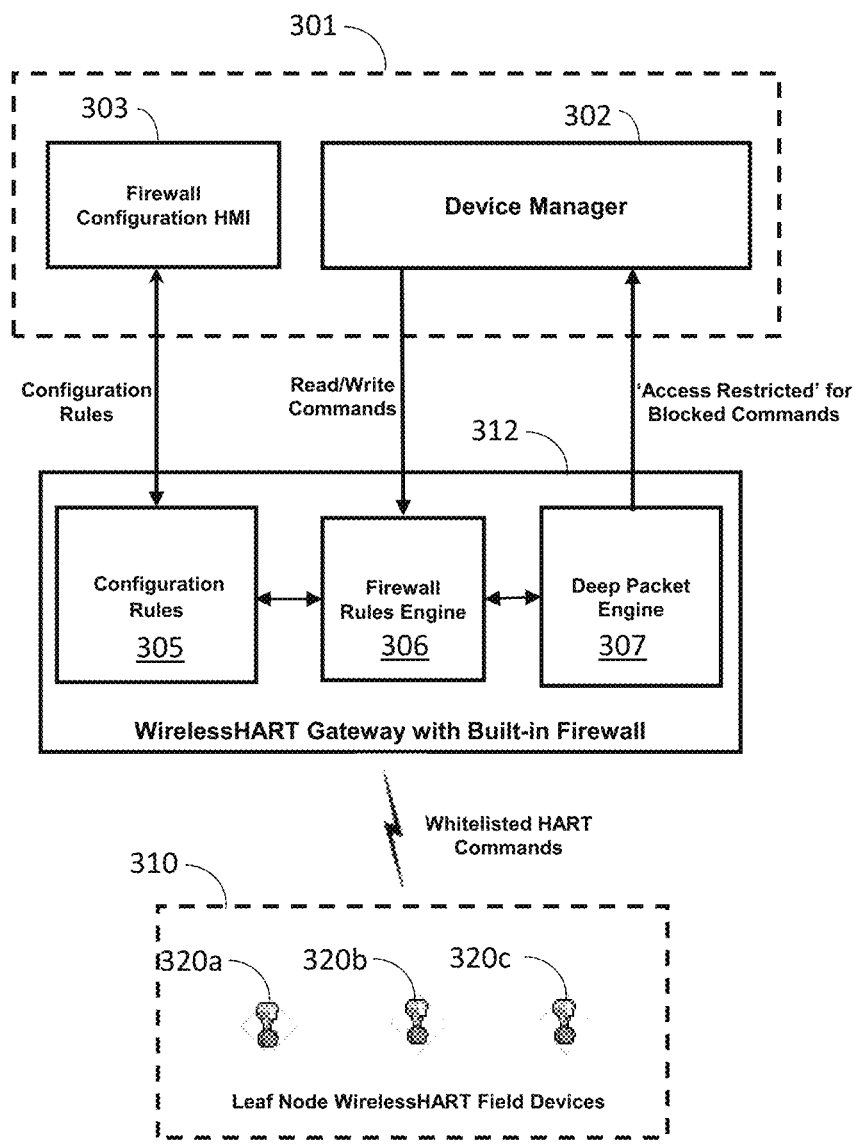
FIG. 3 illustrates the WirelessHART gateway with a built-in firewall in accordance to the present disclosure.

FIG. 3 illustrates an example of a WirelessHART infrastructure gateway 312 with a built-in firewall in accordance to the present disclosure. The WirelessHART gateway 312 acts as a wireless infrastructure gateway between other automation systems, controllers and asset management software, to WirelessHart field instruments 320a-320c or other wireless devices or leaf nodes, such as leaf node 310, operating under a WirelessHART communication protocol. In certain applications, the WirelessHART infrastructure gateway 312 can also play the role of a wireless network manager for a wireless network 100. In this capacity as a network manager the WirelessHART infrastructure gateway can oversee the operation of the wireless network and detect and report any network failures.

In a WirelessHART gateway 312, firewall rules are configured by a user using a GUI (Graphical User Interface) of a web-based firewall configuration software 303 that can also be a part of an asset management software application 301, such as Honeywell's Asset Manager application that monitors assets ranging from field devices to process units. The asset management software provides an integrated support system for both wired and wireless devices via a device manager component 302. The asset management software 301 can reside on a local server 114 or remotely via cloud 116. The commands and data from the firewall configuration software 303 and device manager software 302 are sent to the infrastructure gateway node 312 and its communication unit 206 via controller 104 and network 106.

The firewall rules configuration is done by only a privileged user using configuration access rights assigned to the privileged user. The firewall rules parameters are protected with a SafeKey. The SafeKey is an encrypted key based on the serial number of the gateway or adapter provided to Admin/Privileged user of the wireless system. The privileged user with SafeKey executes a firewall configuration display that is presented to the user by the GUI. The firewall configuration screen prompts the user to enter the SafeKey onto the screen. On validating of the SafeKey, the user is prompted to Enable/Disable the firewall. When the firewall is enabled, the user is prompted to enter the Manufacture ID, Device Type and Device Revision of the connected Hart field instrument that will be protected. Configuration rules are next selected, such as, "Block All HART Universal and Common Practice Write commands", and "Block Specific HART Universal and Common Practice Write commands". Next the user can select specific Block commands from a list of such commands or use a block command from Vendor specific commands for the field instrument that should be blocked. The block commands are sent as DD (device description) commands to the WirelessHART gateway 312 via network 106 to communications unit 206 and stored in the form of read/write parameter configuration rules 305 in an NVS (Non-Volatile Storage) device such as persistent memory 212.

When the WirelessHART gateway 312 receives a Command 77 (master command from device manager 302 for sending commands to connected HART field instruments), the gateway processor 202 loads the firewall configuration rules 305 along with instructions for executing firewall rules engine 306 software from memory 212. The processor 202 then executes the instructions of the firewall rule engine 306. The firewall rules engine first checks if the firewall is enabled or disabled. If enabled, the rules engine 306 checks if the Manufacturer ID, Device Type and any Device revision matches a connected WirelessHART field instrument that has firewall configured values set in the gateway. The DD read/write packets sent from the device manager software 302 are then inspected using deep packet inspection (DPI) by the deep packet engine 307. The deep packet engine software instructions are executed by processor 202 and examine the write commands sent from the device manager software 302. The deep packet engine 307 examines the write commands for a Block All HART Universal and Common Practice Write commands, a Block Specific HART Universal and Common Practice write commands, or any specific block commands from a list of vendor specific commands for the WirelessHART field instrument that should be blocked by the firewall. Upon encountering a block command, the deep packet engine 307 returns an "access restricted' command 16 to the device manager 302 via communication unit 206 and network 106 and blocks the commands from being sent to the WirelessHART field instruments 320a-320c of leaf node 310. Only the allowed or whitelisted read/write commands are allowed to be sent via the wireless connection from the gateway 312 to the WirelessHART field instruments 320a-320c of leaf node 310.

It will be well understood by those skilled in the art that the description of a WirelessHART gateway 312 described above is typically used in a wireless topology that communicates wirelessly between the gateway 312 and wireless devices in the field such as the WirelessHART devices 320a-320c. However, there are instances were field instruments communicate only using a non-wireless connection, using for example, wired current loops or other wired communication protocols to connect to the automation and control system.

Figure 4:
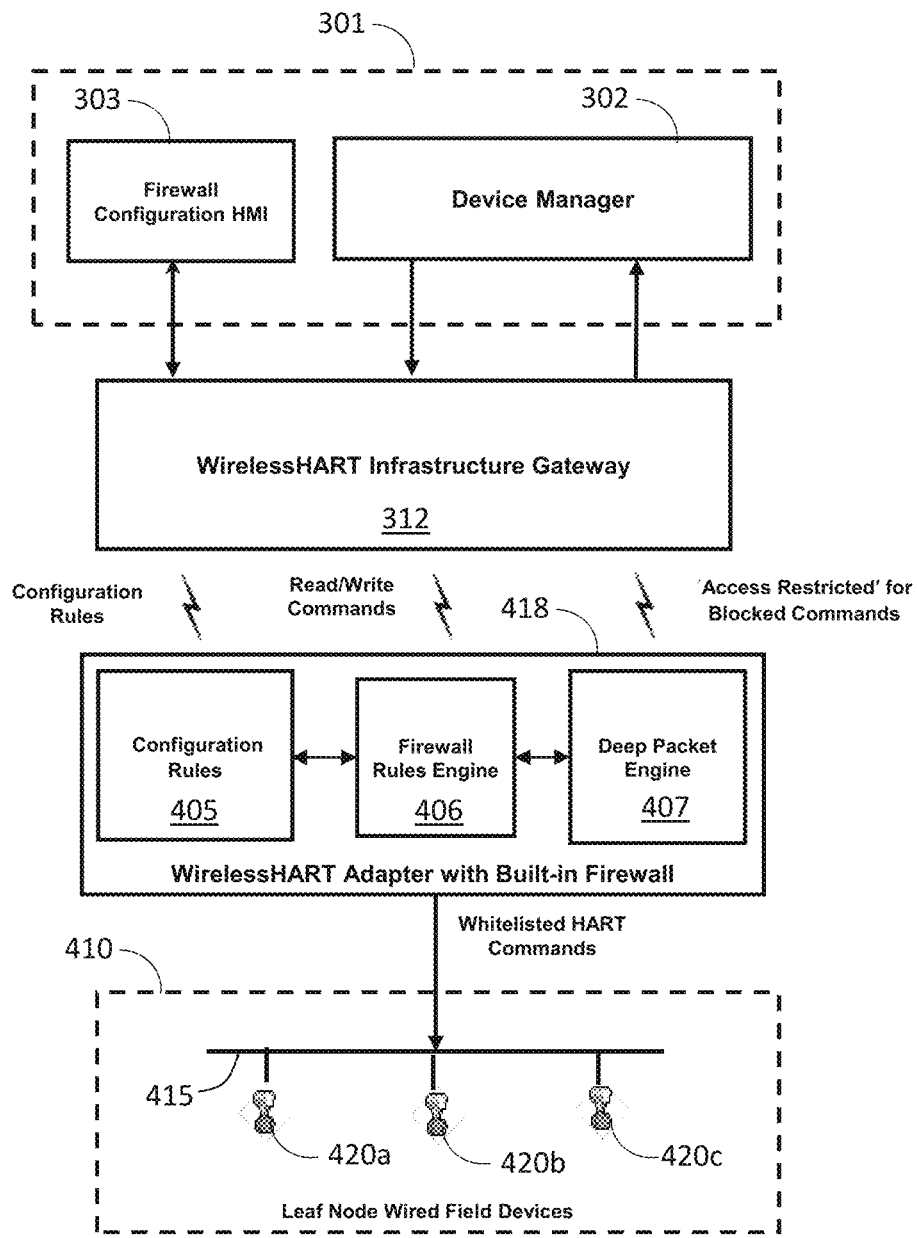
FIG. 4 illustrates the WirelessHART adapter with built-in firewall in accordance to the present invention.

A second embodiment illustrated by FIG. 4 of the present disclosure, shows an example of the installation of the components of a firewall system in a WirelessHART adapter 418. The adapter receives wireless input signals from a WirelessHART gateway 312, that is connected to network 106, however, its outputs commands to HART field instruments or other HART device via a wired communication network 415 operating with a HART communication protocol.

For the WirelessHART adapter 418, firewall rules are configured by a user using a GUI (Graphical User Interface) of a web-based firewall configuration software 303 that can also be a part of an asset management software application 301, that monitors assets ranging from field devices to process units. The asset management software provides an integrated support system for both wired and wireless devices via a device manager component 302. The asset management software 301 can reside on a local server 114 or remotely via cloud 116. The commands and data from the firewall configuration software 303 and device manager software 302 are sent to the infrastructure gateway node 312 and its communication unit 206 via controller 104 and network 106.

Firewall rules are configured by a user using a GUI (Graphical User Interface) of a web-based firewall configuration software 303 that can also be a part of a management software application. The commands and data from the firewall configuration software and device management software is transmitted to the WirelessHART adapter 418 from the WirelessHART gateway 312 via one or more of its wireless radios associated with communication unit 206. One or more wireless radios associated with a communication unit 206 of the WirelessHart adapter 418 receives the commands and data from the WirelessHART gateway 312

The firewall rules configuration is done by only a privileged user using configuration access rights assigned to the privileged user. The firewall rules parameters are protected with a SafeKey. The SafeKey is an encrypted key based on the serial number of the gateway or adapter provided to Admin/Privileged user of the wireless system. The privileged user with SafeKey executes a firewall configuration display that is presented to the user by the GUI. The firewall configuration screen prompts the user to enter the SafeKey onto the screen. On validating of the SafeKey, the user is prompted to Enable/Disable the firewall. When the Firewall is enabled, the user is prompted to enter the Manufacture ID, Device Type and Device Revision of the connected Hart field instrument that will be protected. Configuration rules are next selected, such as, "Block All HART Universal and Common Practice Write commands", and "Block Specific HART Universal and Common Practice Write commands". Next the user can select specific Block commands from a list of such commands or use a block command from vendor specific commands for the field instrument that should be blocked. The block commands are sent as DD (device description) commands to the WirelessHart adapter 418 and stored in the form of read/write parameter configuration rules in an NVS (Non-Volatile Storage) device such as persistent memory 212.

When the WirelessHART adapter 418 receives a Command 77 (master command for sending commands to connected HART field instruments), the adapter 418 loads the firewall configuration rules 405 into a processor 202 from memory 212 along with the instructions of the firewall rules engine 406. The processor 202 then executes the instructions of the firewall rule engine 406. The firewall rule engine first checks if the firewall is Enabled or Disabled. If Enabled, the firewall rules engine checks if the Manufacturer ID, Device Type and any Device revision matches a connected HART instrument that has firewall configured values set in the WirelessHART adapter 418. The DD read/write packets sent from the device manager software 302 to the adapter 418 are then inspected using deep packet inspection (DPI) by the deep packet engine 407. The deep packet engine 407 instructions are executed by the processor 202 and examine the write commands sent from the device manager software 302 and looks for, a Block All HART Universal and Common Practice Write commands, a Block Specific HART Universal and Common Practice write commands, or any specific block commands from a list of vendor specific commands for the wireless field instrument that should be blocked by the firewall. Upon encountering a block command, the deep packet engine 407 returns an "access restricted' command 16 to device manager 302 through the adapter's wireless radio of communication unit 206, to the WirelessHART gateway 312. The blocked read/write command is prevented from being sent to the HART field instruments. Only the allowed or whitelisted read/write commands are allowed to be sent via the wired interface of communication unit 206 to the wired HART loop network 415 connecting the HART field instruments 420a-420c and other wired field devices in leaf node 410.

It is not uncommon in a manufacturing plant using field instrument to have plant maintenance personnel use handheld devices to connect to HART field instruments or other HART devices for calibration, configuration or other maintenance functions. When the plant uses HART instruments to monitor and control critical safety and other process control systems there is need to protect the safety and process control system from undesired configuration changes that may lead to an unexpected or catastrophic shutdown of the plant. It is therefore desirable to have any access to the HART field instrument be made via the firewall system of a WirelessHART adapter 418.

Figure 5:
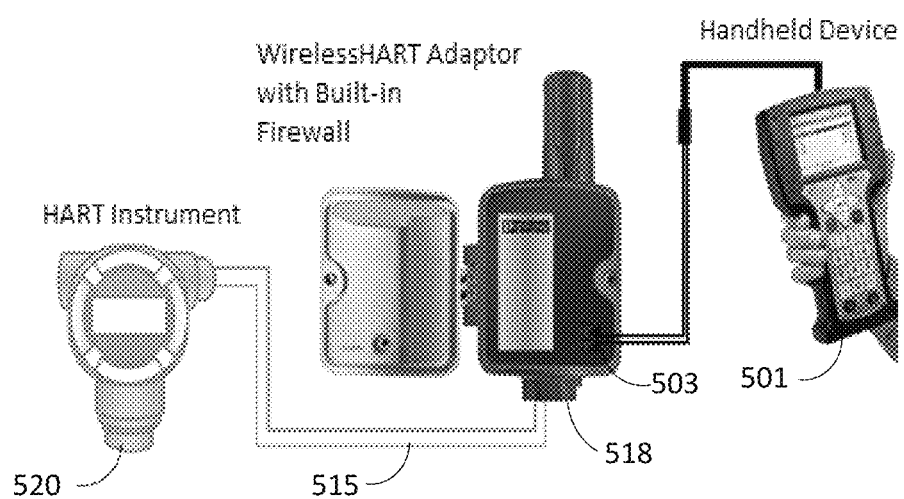
FIG. 5 illustrates the WirelessHART adapter connected to a handheld programming device in accordance to the present invention.

FIG. 5 illustrates the connection of a handheld portable device 501 used to program and configure HART field instruments. The handheld device 501 is connected to a WirelessHART adapter 518 through a connection port 503. The connection port 503 can be an interface of I/O unit 208, as illustrated in FIG. 2. A HART field instrument 520 is connected to the WirelessHART adapter 518 through a wired HART loop 515. This secondary master connection of the handheld device 501 is examined by the deep packet engine of the firewall, as was explained in FIG. 4. If the deep packet engine encounters a block command, the deep packet engine returns an "access restricted' command 16 to the handheld device 501 and an alert to the device manager 302. Only the allowed or whitelisted read/write commands are allowed to be sent from the handheld device 501 to the HART field instrument 520.

It would be well understood by those skilled in the art although the disclosure has been described using the HART protocol other use cases are possible and other interactions could occur using a wireless gateway or wireless adaptor having a built-in firewall. In addition, while one specific mechanism for using an encryption key to validate a user is described, any other suitable mechanisms can be used (regardless of whether they use an encryption key).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
a wireless adaptor comprising at least one interface configured to be coupled to one or more wired field devices;
the wireless adaptor also comprising at least one wireless radio configured to communicate over a wireless network and to receive commands for the one or more wired field devices over the wireless network;
the wireless adaptor further comprising at least one processor configured to:
receive user information identifying one or more rules for a firewall, wherein the one or more rules relates to the commands for the one or more wired field devices; and
execute instructions to provide the firewall for the one or more wired field devices by blocking one or more of the commands from being sent to the one or more wired field devices.

2. The apparatus of claim 1, wherein:
the at least one interface is configured to be coupled to one or more wired Highway Addressable Remote Transducer (HART) field devices; and
the at least one wireless radio is configured to use a WirelessHART wireless network protocol.

3. The apparatus of claim 1, wherein the one or more rules identify that one of:
all universal and common practice write commands are blocked;
certain universal and common practice write commands are blocked; and
certain vendor-specific commands are blocked.

4. A method, comprising:
coupling at least one interface of a wireless adaptor to one or more wired field devices;
using at least one wireless radio of the wireless adaptor to communicate over a wireless network and to receive commands for the one or more wired field devices over the wireless network; and
using at least one processor of the wireless adaptor to:
receive user information identifying one or more rules for a firewall, wherein the one or more rules relates to the commands for the one or more wired field devices; and
execute instructions for providing the firewall for the one or more wired field devices by blocking one or more of the commands from being sent to the one or more wired field devices.

5. The method of claim 4, wherein:
the at least one interface is coupled to one or more wired Highway Addressable Remote Transducer (HART) field devices; and
the at least one wireless radio uses a WirelessHART wireless network protocol.

6. The method of claim 4, wherein the one or more rules identify that one of:
all universal and common practice write commands are blocked;
certain universal and common practice write commands are blocked; and
certain vendor-specific commands are blocked.

7. A non-transitory computer readable medium containing instruction that, when executed by at least one processing device, cause the at least one processing device to perform operations, the operations comprising:
couple at least one interface of a wireless adaptor to one or more wired field devices;

using at least one wireless radio of the wireless adaptor to communicate over a wireless network and to receive commands for the one or more wired field devices over the wireless network; and using at least one processor of the wireless adaptor to:
receive user information identifying one or more rules for a firewall, wherein the one or more rules relates to the commands for the one or more wired field devices; and
execute instructions for providing the firewall for the one or more wired field devices by blocking one or more of the commands from being sent to the one or more wired field devices.

8. An apparatus, comprising:
a wireless gateway comprising at least one interface configured to be coupled to one or more networks;
the wireless gateway also comprising at least one wireless radio configured to communicate over a wireless network and to transmit commands for one or more wireless field devices over the wireless network;
the wireless gateway further comprising at least one processor configured to:
receive user information identifying one or more rules for a firewall, wherein the one or more rules relates to the commands for the one or more wireless field devices; and
execute instructions that provides the firewall for the one or more wireless field devices by blocking one or more of the commands from being sent to the one or more wireless field devices.

9. The apparatus of claim 8, wherein the at least one wireless radio is configured to use a Wireless Highway Addressable Remote Transducer (WirelessHART) wireless network protocol.

10. The apparatus of claim 8, wherein the one or more rules identify that one of:
all universal and common practice write commands are blocked;
certain universal and common practice write commands are blocked; and
certain vendor-specific commands are blocked.

11. A method, comprising:
coupling at least one interface of a wireless gateway to one or more networks;
using at least one wireless radio of the wireless gateway to communicate over a wireless network and to transmit commands for one or more wireless field devices over the wireless network; and
using at least one processor of the wireless gateway to:
receive user information identifying one or more rules for a firewall, wherein the one or more rules relates to the commands for the one or more wireless field devices; and
execute instructions for providing the firewall for the one or more wireless field devices by blocking one or more of the commands from being sent to the one or more wireless field devices.

12. The method of claim 11, wherein the at least one wireless radio uses a Wireless Highway Addressable Remote Transducer (WirelessHART) wireless network protocol.

13. The method of claim 11, wherein the one or more rules identify that one of:
all universal and common practice write commands are blocked;
certain universal and common practice write commands are blocked; and
certain vendor-specific commands are blocked.

14. A non-transitory computer readable medium containing instruction that, when executed by at least one processing device, cause the at least one processing device to perform operations, the operations comprising: couple at least one interface of a wireless gateway to one or more networks;
using at least one wireless radio of the wireless gateway to communicate over a wireless network and to transmit commands for one or more wireless field devices over the wireless network; and
using at least one processor of the wireless gateway to:
receive user information identifying one or more rules for a firewall, wherein the one or more rules relates to the commands for the one or more wireless field devices; and
execute instructions for providing the firewall for the one or more wireless field devices by blocking one or more of the commands from being sent to the one or more wireless field devices.

15. The apparatus of claim 1, wherein the wireless adaptor includes at least one I/O unit configured to be coupled to a handheld programming device,
the wireless adaptor executing instructions to provide the firewall for the one or more wired field devices by blocking one or more of the commands from being sent to the one or more wired field devices from the handheld programming device.

* * * * *